US008838190B2

(12) United States Patent  
Komiyama et al.

(10) Patent No.: US 8,838,190 B2  
(45) Date of Patent: Sep. 16, 2014

(54) PORTABLE ELECTRONIC DEVICE

(75) Inventors: Takehiko Komiyama, Tokyo (JP);  
Seiichirou Gotou, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/881,798

(22) PCT Filed: Oct. 20, 2011

(86) PCT No.: PCT/JP2011/074208  
§ 371 (c)(1),  
(2), (4) Date: Apr. 26, 2013

(87) PCT Pub. No.: WO2012/056999  
PCT Pub. Date: May 3, 2012

(65) Prior Publication Data  
US 2013/0217451 A1 Aug. 22, 2013

(30) Foreign Application Priority Data

Oct. 27, 2010 (JP) ................................ 2010-241493

(51) Int. Cl.  
*H04B 1/38* (2006.01)  
*H04M 1/02* (2006.01)  
*H04M 1/18* (2006.01)

(52) U.S. Cl.  
CPC ............ *H04M 1/0216* (2013.01); *H04M 1/021* (2013.01); *H04M 1/0212* (2013.01); *H04M 1/18* (2013.01)  
USPC .................... 455/575.1; 455/575.3; 455/90.3; 455/347

(58) Field of Classification Search  
CPC ................. H04B 2001/3894; H04M 1/0212; H04M 1/021  
USPC .......................... 455/575.1, 575.3, 90.3, 347  
See application file for complete search history.

(56) References Cited

U.S. PATENT DOCUMENTS

2006/0140439 A1   6/2006   Nakagawa  
2008/0081679 A1   4/2008   Kawasaki et al.  
(Continued)

FOREIGN PATENT DOCUMENTS

JP    2008-106932 A    5/2008  
JP    2009-063029 A    3/2009  
(Continued)

OTHER PUBLICATIONS

International Search Report of PCT Application No. PCT/JP2011/074208 mailed on Jan. 17, 2012.

(Continued)

*Primary Examiner* — Tuan Pham  
(74) *Attorney, Agent, or Firm* — Sughrue Mion, PLLC

(57) ABSTRACT

A portable electronic device (10) includes a first housing (20), an electronic module (32), a first cover (30), a circuit board module (33), and a second cover (35). The electronic module (32) is secured on to one of faces of the first housing (20). The first cover (30) is watertightly attached to the first housing (20) via a waterproof adhesive member (31) to cover the electronic module (32). The circuit board module (33) is secured on another face of the first housing (20). The second cover (35) is watertightly attached to the first housing (20) via a waterproof adhesive member (34) to cover the circuit board module (33).

7 Claims, 8 Drawing Sheets

(56) References Cited

U.S. PATENT DOCUMENTS

| | | |
|---|---|---|
| 2009/0149227 A1 | 6/2009 | Yamaguchi |
| 2010/0134963 A1 | 6/2010 | Suzuki et al. |
| 2010/0254076 A1 | 10/2010 | Hasegawa et al. |
| 2010/0304934 A1* | 12/2010 | Woodson .................. 482/8 |
| 2010/0311475 A1* | 12/2010 | Takatsuka et al. ......... 455/575.1 |

FOREIGN PATENT DOCUMENTS

| | | |
|---|---|---|
| JP | 2009-071461 A | 4/2009 |
| JP | 2009-187893 A | 8/2009 |
| JP | 2009-188488 A | 8/2009 |
| JP | 2009-239670 A | 10/2009 |
| JP | 2010-011205 A | 1/2010 |
| JP | 2010-130582 A | 6/2010 |
| JP | 2010-147551 A | 7/2010 |
| WO | 2009057718 A1 | 5/2009 |
| WO | 2009/098844 A1 | 8/2009 |

OTHER PUBLICATIONS

Extended European Search Report dated May 27, 2014, issued by the European Patent Office in corresponding European Application No. 11836135.1.

* cited by examiner

PORTABLE ELECTRONIC DEVICE

This application is a National Stage Entry of PCT/JP2011/074208 filed Oct. 20, 2011, which claims priority from Japanese Patent Application 2010-241493 filed Oct. 27, 2010, the contents of all of which are incorporated herein by reference, in their entirety.

TECHNICAL FIELD

The present invention relates to a portable electronic device and, more particularly, to a portable electronic device with a waterproof function.

BACKGROUND ART

A portable electronic device is used in various environments because of its portability. To address various use environments, a portable electronic device is desired to have a waterproof function. For example, the following Patent Literatures disclose portable electronic devices with the waterproof function.

PRIOR ART LITERATURE

Patent Literature

Patent Literature 1: Unexamined Japanese Patent Application Kokai Publication No. 2009-187893
Patent Literature 2: Unexamined Japanese Patent Application Kokai Publication No. 2009-239670

SUMMARY OF THE INVENTION

Problem to be Solved by the Invention

In the portable electronic device described in the Patent Literature 1, a gap between components is closed with a waterproof packing. In this case, however, high precision is demanded for the dimensions of the components such as the dimension of a groove in which the waterproof packing is fitted. It is also necessary to compress the waterproof packing by fastening the components by using a member such as a screw or a hook. As a result, the cost increases, and there is the possibility that the yield deteriorates. In addition, since the structure is complicated, it is difficult to reduce the size and thickness of the portable electronic device, and it is against the trend of miniaturization and reduction in thickness of a portable electronic device in recent years.

In the portable electronic device described in the Patent Literature 2, gaps between the components are closed not with a waterproof packing but with a double-faced tape and a simple waterproof structure. However, the portable electronic device has a structure in which a display module is disposed on a circuit board which is enclosed in a housing. Since a number of electronic parts are mounted on the circuit board, the display module is fixed so as to avoid interference with the electronic parts. Consequently, the display module is not sufficiently fixed to the housing and is in an unstable state. Due to this, in the case where the portable electronic device is subject to impact when, for example, the user drops the portable electronic device by mistake, the display module is easily detached from the housing, and there is the possibility that the display module is broken.

The present invention has been achieved under the above-described circumferences and an object of the invention is to provide a portable electronic device with a simple waterproof structure and resistivity to impact.

Means for Solving the Problem

To achieve the object, a portable electronic device according to the present invention includes:
a first housing;
an electronic module fixed to one of faces of the first housing and having an electronic part;
a first cover covering the electronic module by being watertightly attached to the first housing via a waterproof adhesive member;
a circuit board module fixed to the other face of the first housing and including a circuit board; and
a second cover covering the circuit board module by being watertightly attached to the first housing via a waterproof adhesive member.

Effects of the Invention

According to the present invention, waterproof property is assured by the adhesive member and, for example, the electronic module such as a display module is fixed on the first housing without being disposed on the circuit board. Consequently, with the simple waterproof structure, impact resistance can be improved.

MODE FOR CARRYING OUT THE INVENTION

Hereinafter, a cellular phone 10 according to an embodiment of the present invention will be described with reference to the drawings. To facilitate understanding, XYZ coordinates using the X axis as the horizontal direction (right direction) of the cellular phone 10, the Y axis as the vertical direction (upward direction) of the cellular phone 10, and the Z axis as the thickness direction (forward direction) of the cellular phone 10 are set and will be properly referred to.

Figure 1:
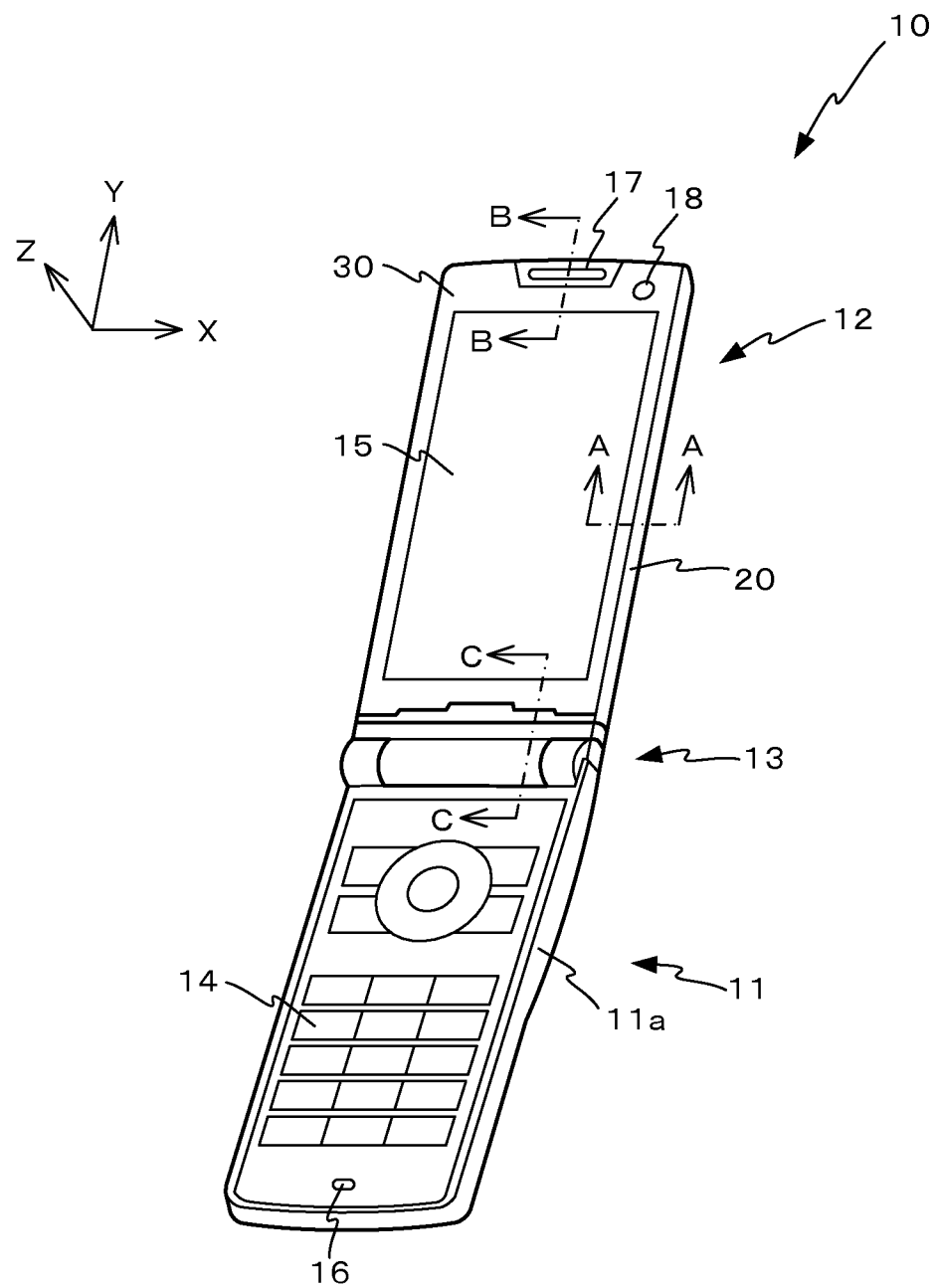
FIG. 1 is a perspective view illustrating a cellular phone according to an embodiment of the present invention.

The cellular phone 10 is a foldable cellular phone which is in a closed state at the time of carriage and, at the time of speech communication, in an expanded state as illustrated in FIG. 1. The cellular phone 10 has an operation unit 11, a display unit 12 and a hinge unit 13, and the display unit 12 is connected to the operation unit 11 via the hinge unit 13 so as to be capable of turning.

The operation unit 11 has an operation housing 11a (second housing) having a rectangular parallelepiped plate shape. In the operation housing 11a, operation keys 14 including a numerical keypad, direction/determination keys, function keys and the like are disposed. Input of information by the user is performed with the operation keys 14.

In the operation housing 11a, internal parts such as an electronic module for detecting an input from the operation keys 14 and a microphone module for converting voice of the user to a sound signal and outputting the sound signal are housed. The microphone module is disposed near a hole 16 formed in the operation housing 11a.

A display screen 15 is disposed in the surface of the display unit 12. In the display screen 15, information such as an image, a figure, characters, symbols and the like is displayed for the user. The display screen 15 is constructed by, for example, a display device such as a liquid crystal display. The user can visually recognizes the display screen 15 from the front side (+Z side) of the display unit 11.

Figure 2:
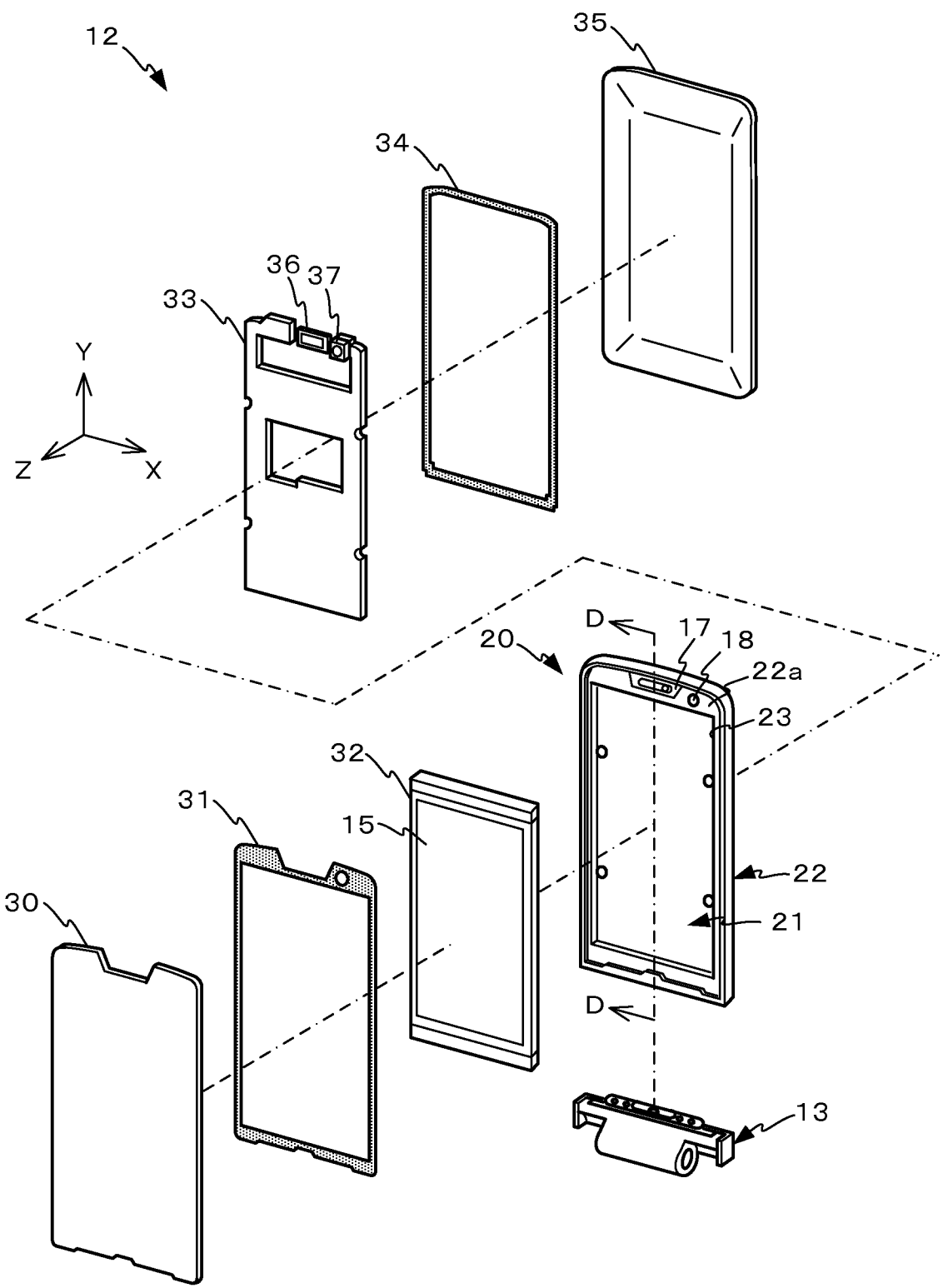
FIG. 2 is an exploded perspective view of a display unit illustrated in FIG. 1.

As illustrated in FIG. 2, the display unit 12 has a display housing (first housing) 20, a front panel (first cover) 30, double-faced tapes (adhesive members) 31 and 34, a display module (electronic module) 32, a circuit board (circuit board module) 33, a rear panel 35 (second cover), a receiver module 36 and a camera module 37.

Figure 3:
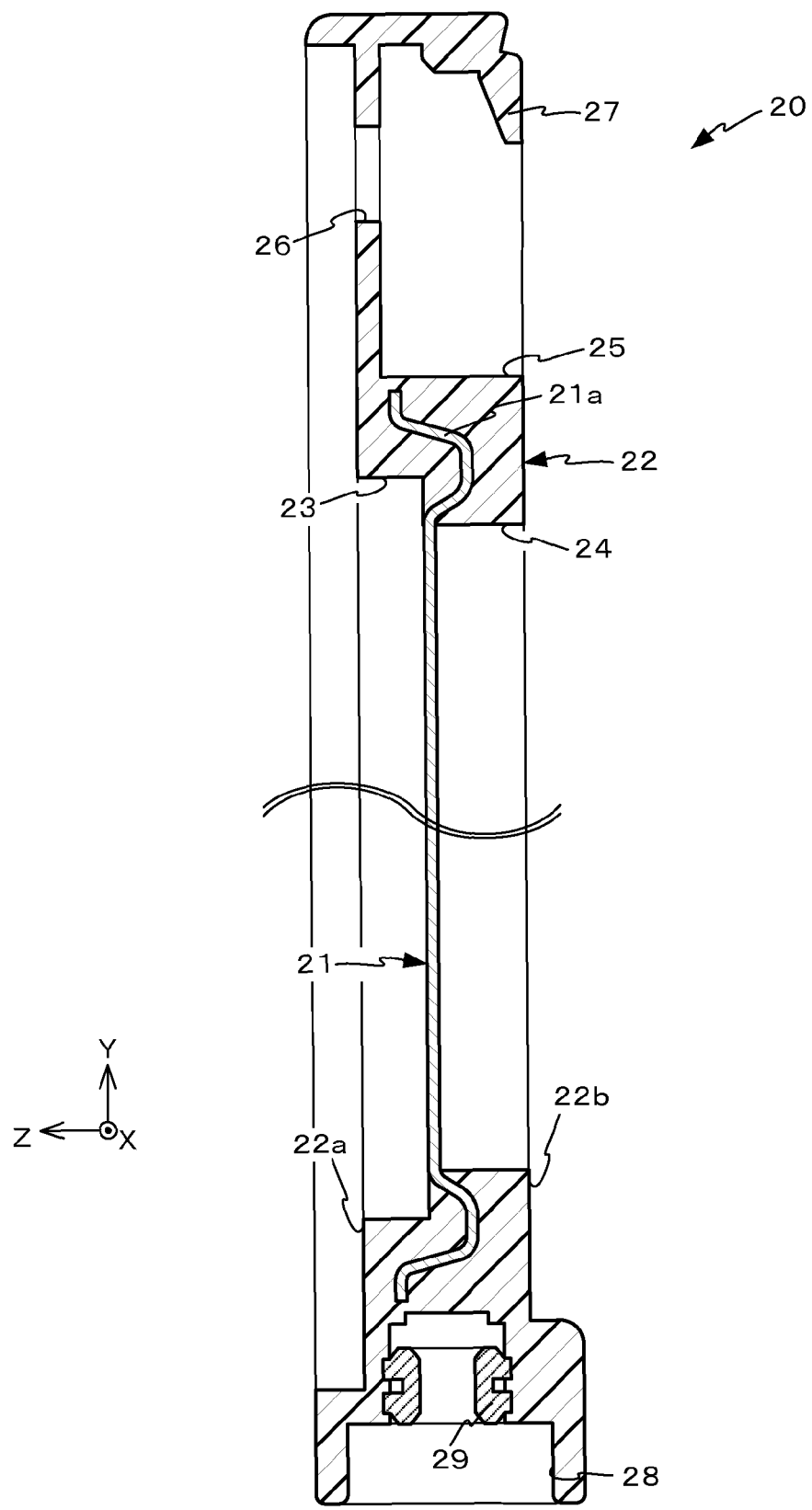
FIG. 3 is a cross section taken along line D-D of a display housing in FIG. 2.

The display housing 20 is a member having an almost rectangular parallelepiped shape and has, as illustrated in FIG. 3, a metal plate 21 and a resin part 22 formed on the metal plate 21. The metal plate 21 is made of, for example, stainless steel. At the periphery of the metal plate 21, a curved part 21a is formed in the entire circumference. By the curved part 21a, the strength of the display housing 20 is assured. The metal plate 21 is formed by, for example, press-molding a plate made of stainless steel.

The resin part 22 is formed in an almost frame shape so as to cover the curved part 21a of the metal plate 21. The resin part 22 is formed by, for example, insert molding. In the face on the front side (+Z side) of the resin part 22, a first adhesion face 22a for attaching the front panel 30 is formed. The first adhesion face 22a is formed along the periphery of a first recess 23 which will be described later.

Similarly, in the face on the rear side (−Z side) of the resin part 22, a second adhesion face 22b for attaching the rear panel 35 is formed. The second adhesion face 22b is formed along the periphery of a second recess 24 which will be described later. The resin part 22 is formed on the metal plate 21 so that the amount of the resin formed on the front side (+Z side) of the metal plate 21 and the amount of the resin formed on the rear side (−Z side) of the metal plate 21 become almost equal.

On the front side (+Z side) of the display housing 20, the first recess 23 defined by the surface on the front side of the metal plate 21 and the surface of the resin part 22 is formed. In the first recess 23, the display module 32 is stored.

Similarly, on the rear side (−Z side) of the display housing 20, the second recess 24 defined by the surface on the rear side of the metal plate 21 and the surface of the resin part 22 is formed. In the second recess 24, the circuit board 33 is stored.

On the rear side (−Z side) of the display housing 20, a module storing part 25 for storing internal parts such as the receiver module 36 and the camera module 37 is formed above the second recess 24. The module storing part 25 is communicated with the front side (+Z side) of the display housing 20 through a hole 26 penetrating the resin part 22 in the thickness direction (Z direction). The shape of the hole 26 is arbitrary. In the embodiment, the hole 26 is formed in an ellipse shape extending in the horizontal direction (X direction). On the rear side (−Z side) of the resin part 22, a canopy 27 is formed so as to cover at least a part of the module storing part 25 in the thickness direction (−Z direction). The face on the rear side (−Z direction) of the canopy 27 serves as a part of the second adhesion face 22b.

Figure 6:
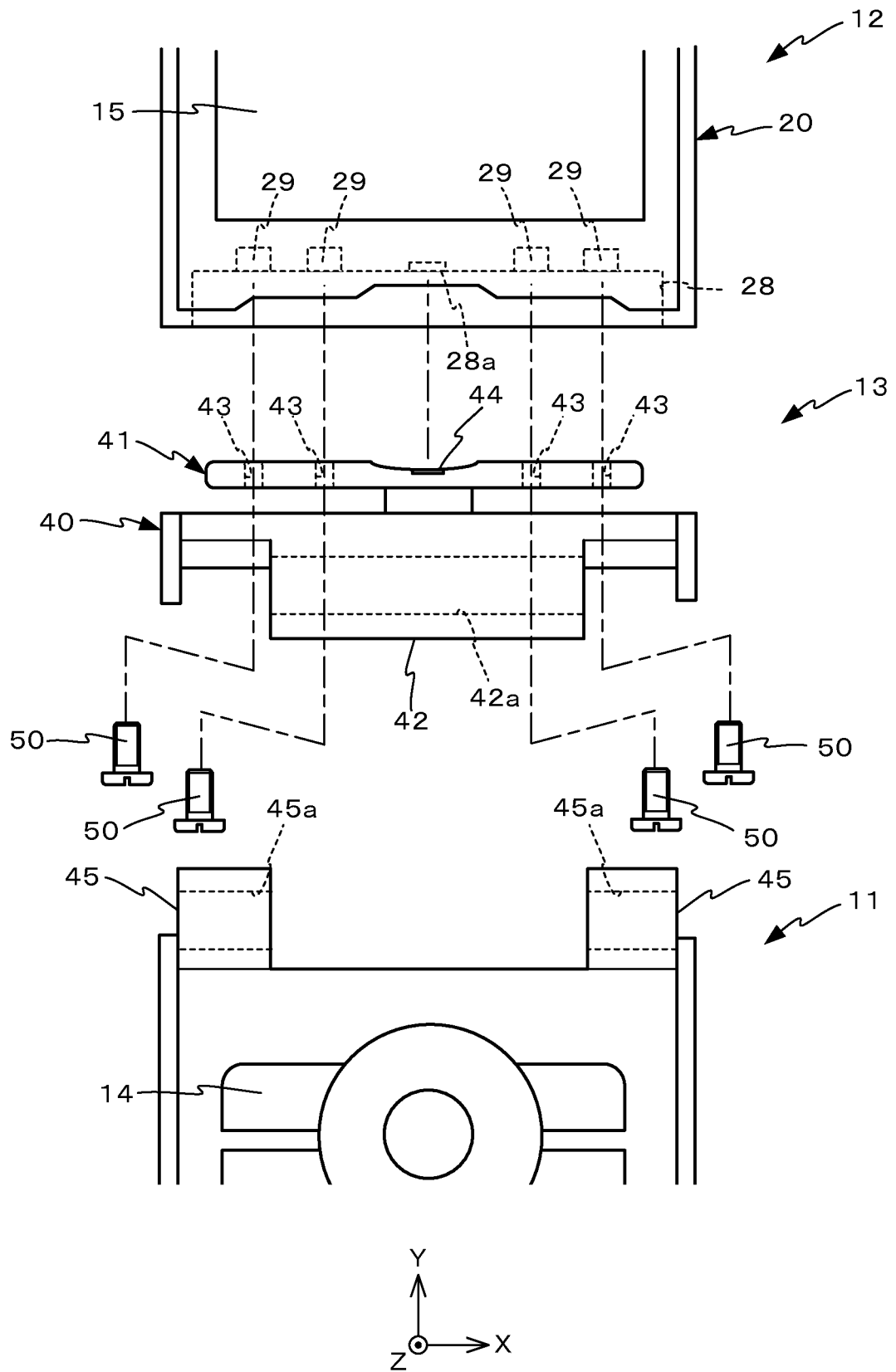
FIG. 6 is a front view of a hinge unit illustrated in FIG. 1.

On the under face side (−Y side) of the display housing 20, a third recess 28 in which the hinge unit 13 to be described later is fitted is formed. A plurality of nuts 29 are embedded in an upper part of the third recess 28. The number of the nuts 29 is arbitrary. In the embodiment, as illustrated in FIG. 6, four nuts 29 are embedded along the horizontal direction (X direction). The axis of the nut 29 is directed in the vertical direction (Y direction) so as to be perpendicular to the thickness direction (Z direction) of the display unit 12.

Figure 4:
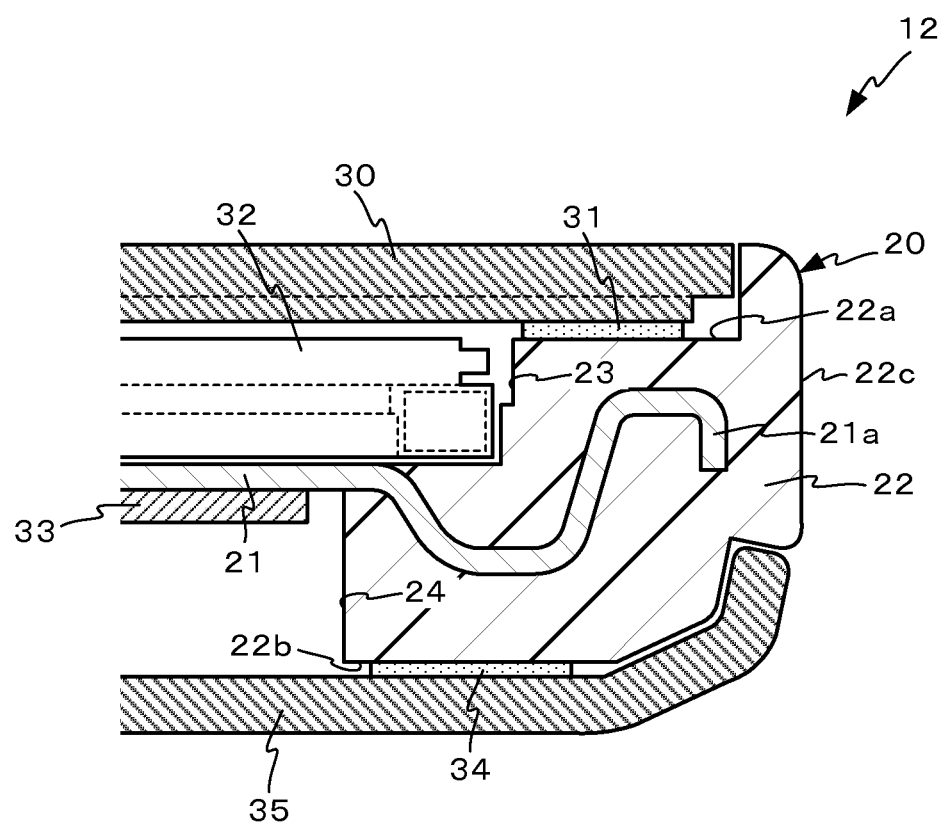
FIG. 4 is a cross section taken along line A-A of the display unit in FIG. 1.
Figure 4:
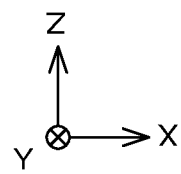

The front panel 30 is formed in an almost plate shape as illustrated in FIG. 4 and protects the display module 32. The front panel 30 is made of, for example, a transparent material made of acrylic. The front panel 30 is fixed to the first adhesion face 22a of the resin part 22 via the double-faced tape 31.

The double-faced tape 31 is made of a waterproof material. The double-faced tape 31 is formed in a frame shape. The double-faced tape 31 is attached to the first adhesion face 22a of the resin part 22.

The display module 32 comprises a display device having the display screen 15, a board on which the display device is mounted, and the like. The display module 32 is stored in the first recess 23 in the display housing 20 and directly fixed on the metal plate 21. The display module 32 is electrically connected to the circuit board 33 by a not-illustrated flexible wiring board or the like.

The circuit board 33 is made of, for example, epoxy resin. On the circuit board 33, a circuit pattern is formed and not-illustrated electronic parts and the like are mounted. The circuit board 33 is stored in the second recess 24 in the display housing 20 and directly fixed on the metal plate 21.

The rear panel 35 is formed in an almost plate shape and protects the circuit board 33, the receiver module 36, the camera module 37 and the like. The rear panel 35 is made of, for example, resin. The rear panel 35 is fixed to the second adhesion face 22b of the resin part 22 via the double-faced tape 34.

The double-faced tape 34 is made of a waterproof material like the double-faced tape 31. The double-faced tape 34 is formed in a frame shape. The double-faced tape 34 is attached to the second adhesion face 22b of the resin part 22.

Figure 5A:
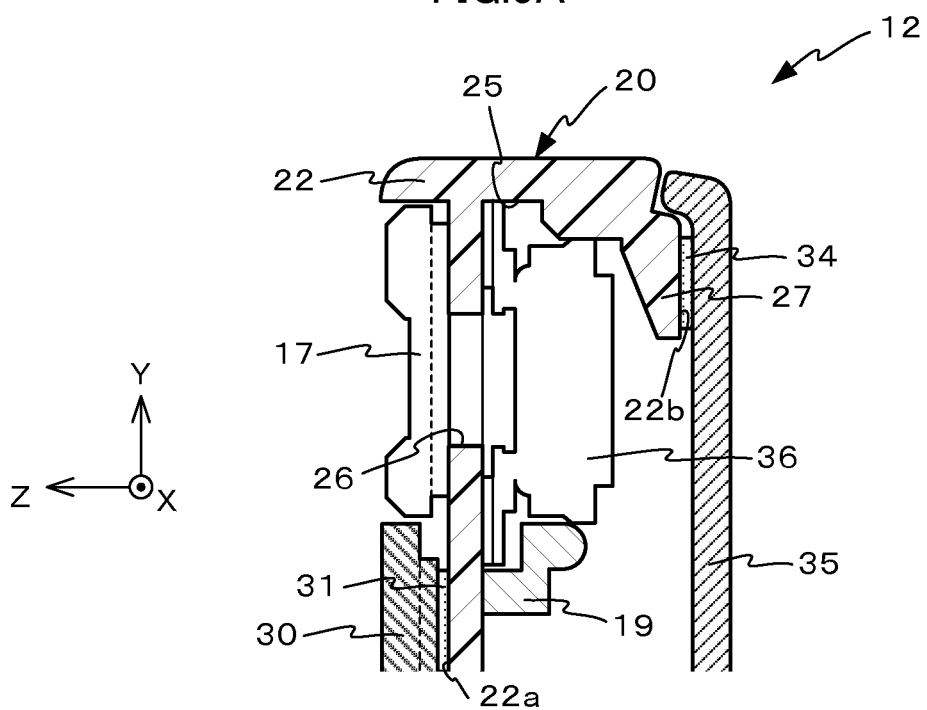
FIG. 5A is a cross section taken along line B-B of the display unit in FIG. 1.

The receiver module 36 outputs sound based on a sound signal. As illustrated in FIG. 5A, the receiver module 36 is inserted from below the canopy 27 and stored in the module storing part 25. The receiver module 36 is fixed by a receiver module holder 19 and disposed near the hole 26. A cover 17 is attached on the front side (+Z side) of the hole 26. The cover 17 is a member for protecting the receiver module 36 from water and dusts and is made of, for example, resin.

The camera module 37 comprises an image sensor such as a CMOS sensor and is used for capturing an image of the user or the like. The camera module 37 is disposed near a hole 18 in the display housing 20 illustrated in FIG. 1.

As illustrated in FIG. 6, the hinge unit 13 has a hinge unit body 40 and a rotation plate 41 attached to the upper side (+Y side) of the hinge unit body 40.

The rotation plate 41 is attached to the hinge unit body 40 so as to be capable of turning around the Y axis. In the rotation plate 41, a plurality of holes 43 penetrating in the vertical direction (Y direction) are formed in the horizontal direction (X direction). The hole 43 is formed, for example, in a circular shape. The number of holes 43 is equal to the number of nuts 29 embedded in the lower part of the display housing 20. In the embodiment, the four holes 43 are formed. In the center of the rotation plate 41, a waterproof connector 44 is formed. In the case where the hinge unit 13 is connected to the display unit 12, the connector 44 is connected to a connector 28a formed in the third recess 28 in the display housing 20.

Figure 5B:
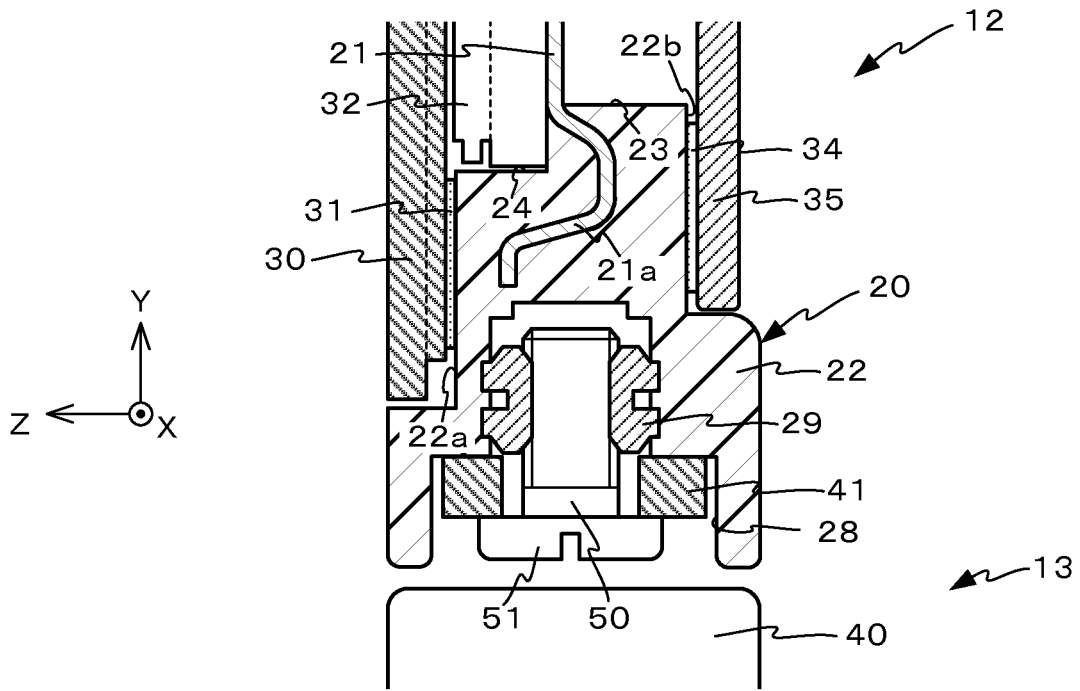
FIG. 5B is a cross section taken along line C-C of the display unit in FIG. 1.

The hinge unit 13 is attached to the display unit 12 by a fastening screw 50. Specifically, the fastening screw 50 is screwed in the hole 43 in the rotation plate 41 and the nut 29 of the display housing 20 in the vertical direction (+Y direction) of the display unit 12, thereby attaching the rotation plate 41 to the display housing 20. Consequently, as illustrated in FIG. 5B, the hinge unit 13 and the display unit 12 are connected. At the same time, the connector 44 formed in the rotation plate 41 of the hinge unit 13 and the connector 28a formed in the third recess 28 of the display housing 20 are connected to each other. A screw head 51 of the fastening screw 50 screwed is housed in the third recess 28 in the display housing 20. The fastening screw 50 is disposed so as to at least partly overlap the first adhesion face 22a in the display housing 20 and the double-faced tape 21 attached to the first adhesion face 22a in the thickness direction (Z direction) of the display housing 20.

As illustrated in FIG. 6, a hinge cylinder 42 is formed in the lower side (−Y side) of the hinge unit body 40. In the hinge cylinder 42, a hole 42a penetrating in the X axis direction is formed.

A pair of hinge cylinders 45 is formed at an end on the upper side (+Y side) of the operation unit 11. In each of the hinge cylinders 45, a hole 45a penetrating in the X axis direction is formed. The hinge shaft is inserted in the hole 45a and the hole 42a formed in the hinge cylinder 42 in the hinge unit body 40. By the insertion of the hinge shaft, the operation unit 11 and the hinge unit 13 are connected to each other so as to be capable of turning about the X axis.

In the hinge unit body 40, a not-illustrated cable is disposed. As the cable, for example, a coaxial cable covered with a waterproof tube, a waterproof flexible cable or the like is used. One end of the cable is connected to the connector 44 of the rotation plate 41, and the other end of the cable is drawn from the hinge cylinder 42 and connected to an electronic unit or the like of the operation unit 11.

The cellular phone 10 is assembled as follows. As understood by referring to FIG. 4, first, the display module 32 is fixed in the first recess 23 in the display housing 20. Similarly, the circuit board 33 is fixed in the second recess 24 in the display housing 20 by a screw or the like. A not-illustrated flexible wiring board or the like is connected to the display module 32 and the circuit board 33. In such a manner, the display module 32 and the circuit board 33 are electrically connected to each other.

Next, as understood by referring to FIG. 5A, the receiver module 36 is inserted in the module storing part 25 from below the canopy 27 in the resin part 22. The lower end of the receiver module 36 is fixed by the receiver module holder 19. Similarly, the not-illustrated camera module 37 (illustrated in FIG. 2) is inserted in the module storing part 25 from below the canopy 27 in the resin part 22 and fixed.

Next, as understood by referring to FIGS. 4 and 5, the double-faced tape 31 is attached to the first adhesion face 22a of the resin part 22 in the display housing 20. Via the double-faced tape 31, the front panel 30 is fixed to the first adhesion face 22a. Similarly, the double-faced tape 34 is attached to the second adhesion face 22b of the resin part 22. Via the double-faced tape 34, the front panel 30 is fixed to the second adhesion face 22b. In such a manner, the display module 32, the circuit board 33, and the like are protected watertightly in the display housing 20. It completes the assembly of the display unit 12.

As understood by referring to FIG. 6, the fastening screws 50 are inserted in the nuts 29 in the display housing 20 respectively via the holes 43 in the rotation plate 41 in the hinge unit 13. At this time, the rotation plate 41 is turned about the Y axis by 90° with respect to the hinge unit body 40. The fastening screws 50 are screwed in by using a tool such as a driver. As a result, the hinge unit 13 is connected to the display unit 12.

The hinge shaft is inserted in the hinge cylinder 42 in the hinge unit body 40 of the hinge unit 13 and the hinge cylinder 45 in the operation unit 11. By the insertion, the hinge unit 13 is connected to the operation unit 11. It completes the assembly of the cellular phone 10.

Figure 7A:
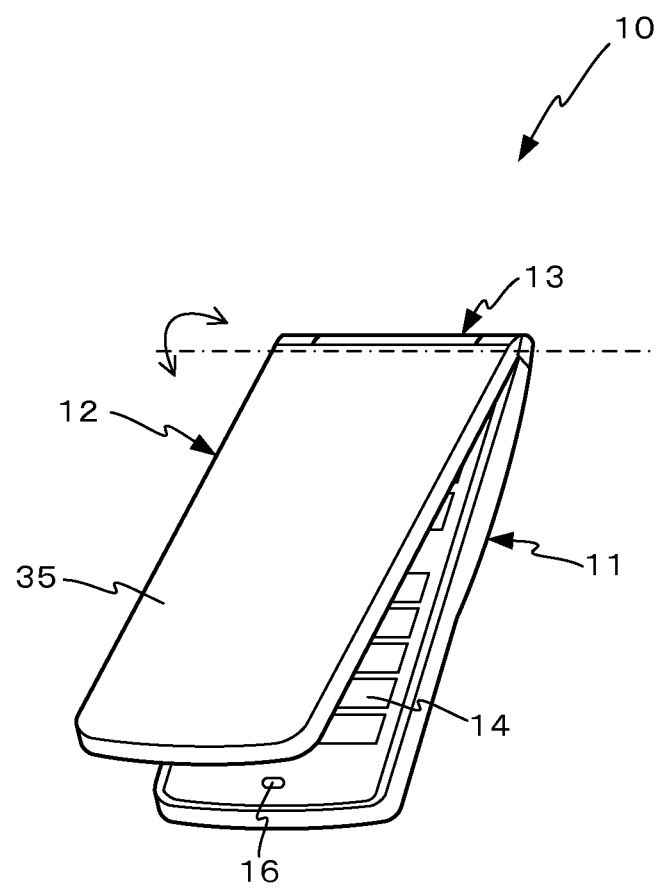
FIG. 7A is a perspective view of the cellular phone illustrated in FIG. 1 for explaining turning about the X axis of the display unit.
Figure 7A:
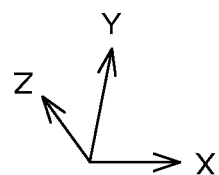
Figure 7B:
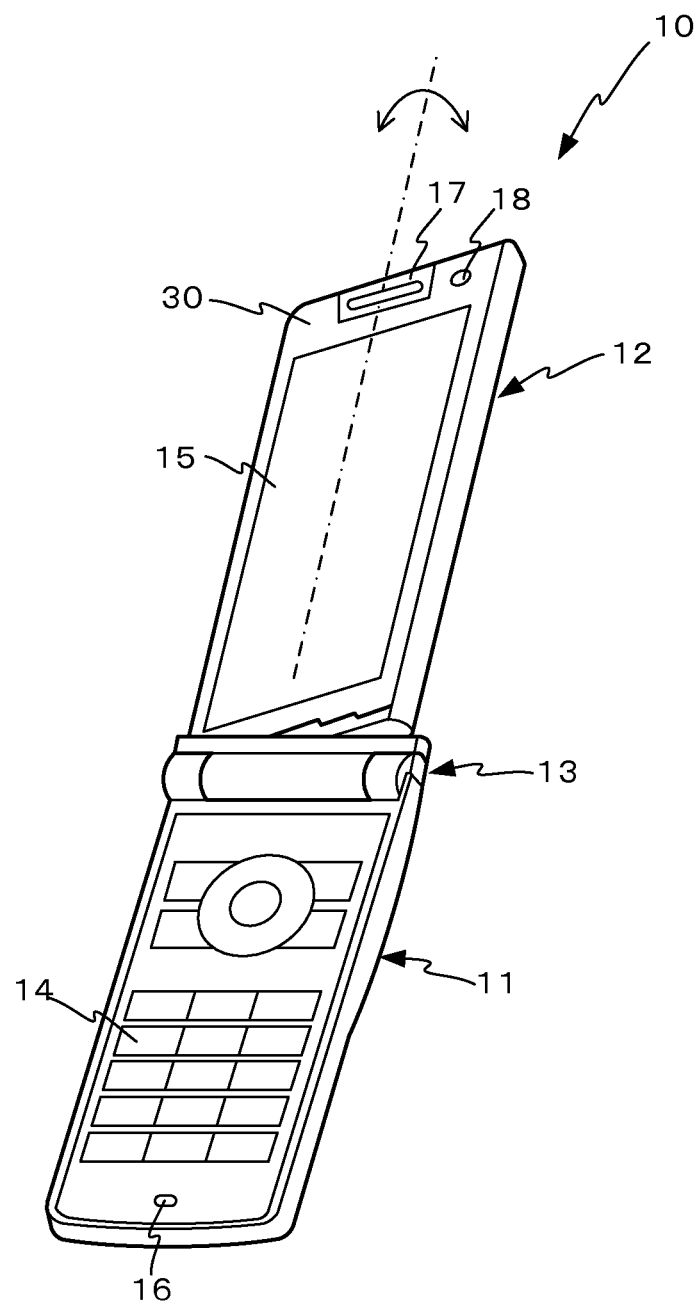
FIG. 7B is a perspective view of the cellular phone illustrated in FIG. 1 for explaining turning about the Y axis of the display unit.

The cellular phone 10 constructed as described above can be changed from the expanded state as illustrated in FIG. 1 to the closed state as illustrated in FIG. 7A by turning the display unit 12 about the X axis. On the contrary, the cellular phone 10 can be changed from the closed state as illustrated in FIG. 7A to the expanded state as illustrated in FIG. 1 by turning the display unit 12 about the X axis. Further, in the expanded state, the display unit 12 can be turned about the Y axis as illustrated in FIG. 7B.

As described above, in the cellular phone 10 according to the embodiment, the front and rear panels 30 and 35 of the display unit 12 are fixed to the display housing 20 via the double-faced tapes 31 and 34 made of the waterproof material. In such a manner, the waterproof property of the display unit 12 can be assured with the simple structure.

Concretely, for example, when a gap between components is closed with a waterproof packing like in a conventional cellular phone, to realize the waterproof function, high precision is demanded for the dimensions of the components. In this case, the waterproof packing has to be compressed by fastening the components by using a member such as a screw or a hook.

On the other hand, in the display unit 12 of the cellular phone 10 according to the embodiment, the gaps among the front panel 30, the rear panel 35, and the display housing 20 are closed with the double-faced tapes 31 and 34, not with a waterproof packing Consequently, precision as high as that required for the conventional cellular phone having the waterproof packing is unnecessary. In addition, a member for compressing the waterproof packing such as a screw or hook is unnecessary. Therefore, the cost can be lowered, and the yield can be made excellent. It can contribute to miniaturization and reduction in thickness of the cellular phone 10. The assembly work of the cellular phone 10 also becomes easier.

In the cellular phone 10 according to the embodiment, the display module 32 is fixed to the display housing 20 without being disposed on the circuit board. With the configuration, even in the case where the portable electronic device 10 is subject to impact when, for example, the user drops it by mistake, the display module 32 is not easily detached from the display housing 20. As a result, breakage of the display module 32 caused by detachment from the display housing 20 can be prevented.

The display housing 20 has the canopy 27 in which the second adhesion face 22b is formed on the rear side (−Z side), and internal parts such as the receiver module 36 are stored on the front side (+Z side) of the canopy 27. Consequently, the internal parts such as the receiver module 36 and the double-faced tape 34 are disposed so as to be at least partly overlapped in the thickness direction (Z direction) of the cellular phone 10. The configuration contributes to reduction in the dimensions in the vertical and horizontal directions (X and Y directions) of the cellular phone 10 without increasing the dimension in the thickness direction (Z direction) of the cellular phone 10. In a cellular phone using a waterproof packing as a comparison example, since the thickness of the waterproof structure is relatively large, when the waterproof packing and the internal part are disposed so as to be overlapped in the thickness direction, the thickness of the cellular phone largely increases. In contrast, the cellular phone 10 of the embodiment does not employ the waterproof packing, but employs the waterproof structure of the double-faced tape 34 so that miniaturization in the vertical and horizontal directions can be realized while suppressing the thickness of the cellular phone 10.

The resin part 22 in the display housing 20 is formed on the front side (+Z side) and the rear side (−Z side) of the metal plate 21. Consequently, substantial thickness of the resin part 22 can be made smaller than the thickness of resin in a housing made only of resin. It can prevent shrinkage which occurs at the time of hardening of resin filled in a mold. In particular, as illustrated in FIG. 4, a curved part 21a of the metal plate 21 curves along the first adhesion face 22a, the second adhesion face 22b, and an outer periphery face 22c of the resin part 22. Therefore, shrinkage which occurs in the first and second adhesion faces 22a and 22b required to have high flatness and the outer periphery face 22c as a part of the appearance of the cellular phone 10 is prevented effectively, and the waterproof property and esthetic appearance of the cellular phone 10 can be improved.

The resin part 22 is formed on the metal plate 21 so that the amount of the resin formed on the front side (+Z side) of the metal plate 21 and the amount of the resin formed on the rear side (−Z side) of the metal plate 21 become almost equal. It can prevent occurrence of a warp in the resin part 22 at the time of insert molding.

The display housing 20 is formed integrally as a single housing part, not an assembly of a plurality of housing parts. Consequently, the structure of the cellular phone 10 is simple and assembly is easy.

The screw head 51 of the fastening screw 50 screwed in the display housing 20 is stored in the third recess 28 in the display housing 20. Therefore, in the case where the cellular phone 10 is in the expanded state illustrated in FIG. 1, the screw head of the fastening screw 50 is not exposed to the outside and does not deteriorate the esthetic appearance of the cellular phone 10. Moreover, it is unnecessary to prepare a cover member or the like to hide the screw head 51.

The fastening screw 50 is screwed in a direction perpendicular to the thickness direction (Z direction) of the cellular phone 10. Consequently, as compared with a cellular phone in which a fastening screw is screwed in the thickness direction (Z direction), the adhesion area of the double-faced tapes 31 and 34 can be assured largely.

Further, the fastening screw 50 is disposed so as to at least partly overlap the first adhesion face 21a of the display housing 20 and the double-faced tape 31 adhered to the first adhesion face 21a in the thickness direction (Z direction) of the cellular phone 10. Therefore, the dimension in the vertical direction (Y direction) of the display housing 20 can be reduced, and it can contribute to miniaturization of the cellular phone 10.

Although the embodiments have been described above, the present invention is not limited to the foregoing embodiments.

For example, although the cellular phone 10 is a foldable cellular phone in the foregoing embodiments, the cellular phone 10 is not limited to the above but may be a slide-type cellular phone, a cellular phone of a turnable biaxial hinge type, a revolving-type cellular phone, or the like.

In the foregoing embodiments, only the display housing 20 of the display unit 12 is the member formed by insert molding. The present invention, however, is not limited to the embodiments. The operation housing 11a of the operation unit 11 may also be a member formed by insert molding like the display housing 20.

The display housing 20 of the foregoing embodiments is a member formed by the metal plate 21 and resin by insert molding. The invention, however, is not limited to the embodiments. The display housing 20 may be a member made only of a single material such as metal or resin.

The front and rear panels 30 and 35 of the embodiments are fixed to the display housing 20 via the double-faced tapes 31 and 34. The invention is not limited to the embodiments. The front and rear panels 30 and 35 may be fixed to the display housing 20 by an arbitrary adhesive member such as a solid/liquid adhesive.

In the embodiments, as understood by referring to FIG. 5B, the fastening screw 50 is disposed further below (in the −Y direction) the lower end of the double-faced tape 34. The invention is not limited to the configuration. The fastening screw 50 may be disposed so as to at least partly overlap the second adhesion face 20b of the display housing 20 and the double-faced tape 34 adhered to the second adhesion face 20b in the thickness direction (Z direction) of the cellular phone 10. With the configuration, the dimension in the vertical direction (Y direction) of the display housing 20 can be reduced and, consequently, it can contribute to miniaturization of the cellular phone 10.

The present invention is not limited to the cellular phones described in the foregoing embodiments but can be also applied to portable communication terminals such as a PDA (Personal Digital Assistant), a PHS (Personal Handy-phone System), and a mobile PC (Personal Computer) and other information processors.

The present invention can be variously embodied and modified without departing from the spirit in a broad sense and scope of the present invention. The foregoing embodiments are provided to describe the present invention and do not limit the scope of the present invention.

The embodiments can be partly or entirely also described as the following additional description but the invention is not limited to the following.

Additional Description 1

A portable electronic device comprising:
a first housing;
an electronic module fixed to one of faces of the first housing and having an electronic part;
a first cover covering the electronic module by being watertightly attached to the first housing via a waterproof adhesive member;
a circuit board module fixed to the other face of the first housing and including a circuit board; and
a second cover covering the circuit board module by being watertightly attached to the first housing via a waterproof adhesive member.

Additional Description 2

The portable electronic device described in the additional description 1, wherein a first recess is formed in the one of the faces of the first housing, a second recess is formed in the other face of the first housing, the electronic module is stored in the first recess, and the circuit board module is stored in the second recess.

Additional Description 3

The portable electronic device described in the additional description 2, wherein the first housing has a metal plate and a resin part covering a periphery of the metal plate and formed in an almost frame shape, the first recess and the second recess are defined by an inner peripheral face having an almost frame shape of the resin and a surface of the metal plate, and the electronic module and the circuit board module are fixed on the surface of the metal plate.

Additional Description 4

The portable electronic device described in the additional description 3, wherein an amount of resin of the resin part formed on one of faces of the metal plate is equal to an amount of resin formed on the other face of the metal plate.

Additional Description 5

The portable electronic device described in any one of the additional descriptions 2 to 4, wherein a first adhesion face for adhering the adhesive member is formed along the periphery of the first recess in one of faces of the first housing, and a second adhesion face for adhering the adhesive member is formed along the periphery of the second recess in the other face of the first housing.

Additional Description 6

The portable electronic device described in the additional description 5, wherein a storing part for storing an internal part and a canopy covering at least a part of the storing part in the thickness direction of the portable electronic device are formed in the one of the faces of the first housing, a part of the first or second adhesion face is formed in one of the faces of the canopy, and the internal part and the adhesive member are disposed so as to be at least partly overlapped in the thickness direction of the portable electronic device.

Additional Description 7

The portable electronic device described in any one of the additional descriptions 1 to 6, wherein the electronic module has a display unit for displaying information to the user.

Additional Description 8

The portable electronic device described in any one of the additional descriptions 1 to 7, further comprising:

a second housing;

a hinge unit connecting the first and second housings so as to be capable of turning; and a fastening screw fixing the hinge unit to the first housing, wherein the fastening screw is screwed in the first housing in a direction perpendicular to the thickness direction of the first housing.

Additional Description 9

The portable electronic device described in the additional description 8, wherein a third recess for storing a screw head of the fastening screw screwed in the first housing is formed in the first housing.

Additional Description 10

The portable electronic device described in the additional description 8 or 9, wherein the fastening screw and the adhesive member are disposed so as to be at least partly overlapped in the thickness direction of the portable electronic device.

The present application claims priority based on Japanese Patent Application No. 2010-241493 filed on Oct. 27, 2010, and the entire contents of the specification, the scope of claims, and the drawings of the Japanese Patent Application No. 2010-241493 are incorporated herein by reference.

INDUSTRIAL APPLICABILITY

The portable electronic device of the present invention is suitable for use in a cellular phone.

DESCRIPTION OF REFERENCE NUMERALS

10 Cellular phone
11 Operation unit
11a Operation housing (second housing)
12 Display unit
13 Hinge unit
14 Operation key
15 Display screen
16 Hole
17 Cover
18 Hole
19 Receiver module holder
20 Display housing (first housing)
21 Metal plate
22 Resin part
22a First adhesion face
22b Second adhesion face
22c Outer periphery face
23 First recess
24 Second recess
25 Module storing part
26 Hole
27 Canopy
28 Third recess
29 Nut
30 Front panel (first cover)
31, 34 Double-faced tape (adhesive member)
32 Display module (electronic module)
33 Circuit board (circuit board module)
35 Rear panel (second cover)
36 Receiver module
37 Camera module
40 Hinge unit body
41 Rotation plate
42, 45 Hinge cylinder
42a, 45a Hole
43 Hole
44 Connector 50 Fastening screw
51 Screw head

What is claimed is:

1. A portable electronic device comprising:
a first housing;
an electronic module fixed to one of faces of the first housing and having an electronic part;
a first cover covering the electronic module by being watertightly attached to the first housing via a waterproof adhesive member;
a circuit board module fixed to the other face of the first housing and including a circuit board; and
a second cover covering the circuit board module by being watertightly attached to the first housing via a waterproof adhesive member,
wherein:
a first recess is formed in the one of the faces of the first housing,
a second recess is formed in the other face of the first housing,
the electronic module is stored in the first recess,
the circuit board module is stored in the second recess,
a first adhesion face for adhering the adhesive member is formed along the periphery of the first recess in one of faces of the first housing,
a second adhesion face for adhering the adhesive member is formed along the periphery of the second recess in the other face of the first housing,
a storing part for storing an internal part and a canopy covering at least a part of the storing part in the thickness direction of the portable electronic device are formed in the one of the faces of the first housing,
a part of the first or second adhesion face is formed in one of the faces of the canopy, and
the internal part and the adhesive member are disposed so as to be at least partly overlapped in the thickness direction of the portable electronic device.

2. The portable electronic device according to claim 1, wherein:
the first housing has a metal plate and a resin part covering a periphery of the metal plate and formed in an almost frame shape,
the first recess and the second recess are defined by an inner peripheral face having an almost frame shape of the resin and a surface of the metal plate, and
the electronic module and the circuit board module are fixed on the surface of the metal plate.

3. The portable electronic device according to claim 2, wherein an amount of resin of the resin part formed on one of faces of the metal plate is equal to an amount of resin formed on the other face of the metal plate.

4. The portable electronic device according to claim 1, wherein the electronic module has a display unit for displaying information to the user.

5. The portable electronic device according to claim 1, further comprising:
a second housing;
a hinge unit connecting the first and second housings so as to be capable of turning; and
a fastening screw fixing the hinge unit to the first housing,
wherein the fastening screw is screwed in the first housing in a direction perpendicular to the thickness direction of the first housing.

6. The portable electronic device according to claim 5, wherein a third recess for storing a screw head of the fastening screw screwed in the first housing is formed in the first housing.

7. The portable electronic device according to claim 5, wherein the fastening screw and the adhesive member are disposed so as to be at least partly overlapped in the thickness direction of the portable electronic device.

* * * * *